UNITED STATES PATENT OFFICE 2,252,633

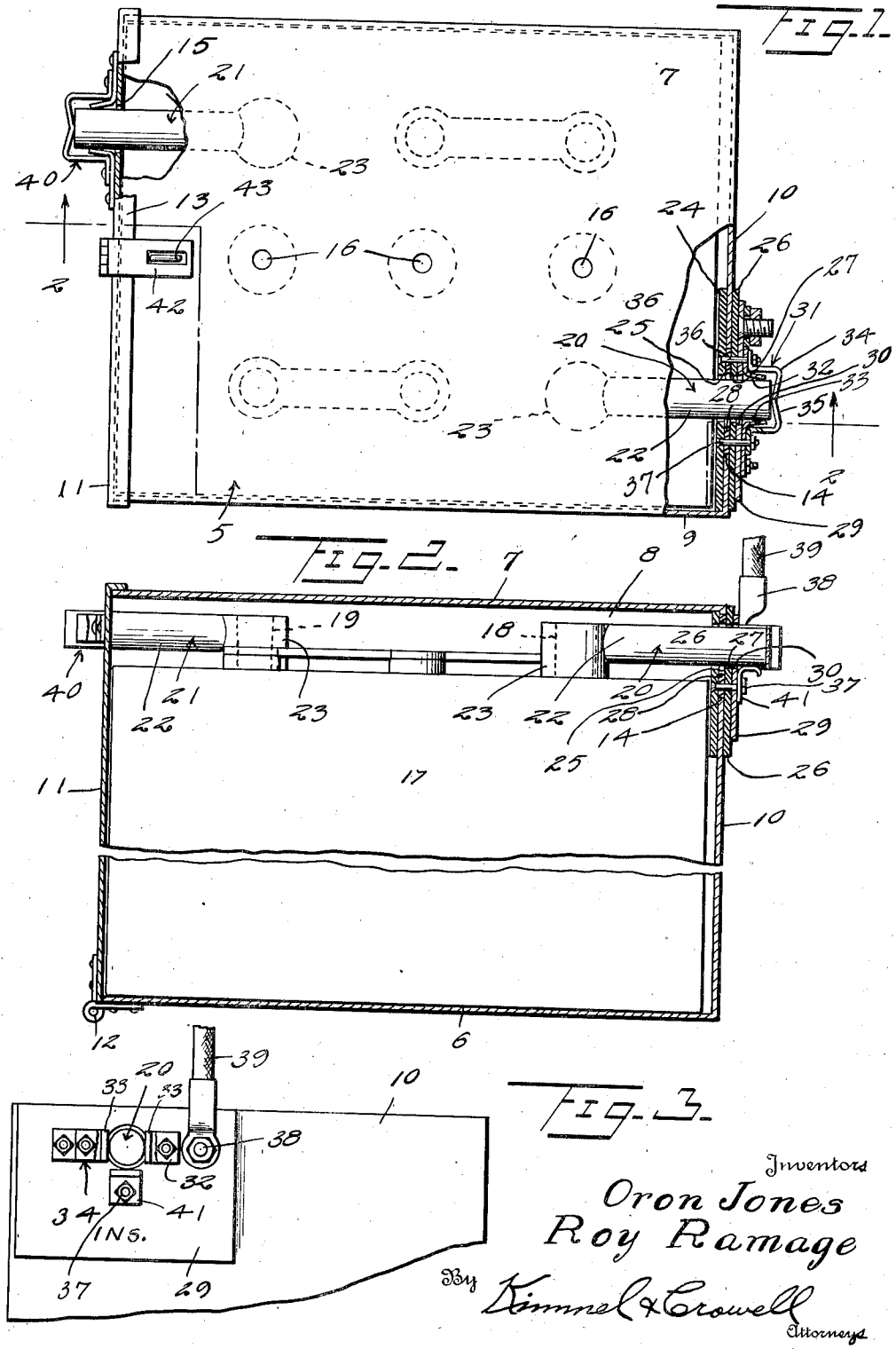

BATTERY AND HOLDER

Oron Jones and Roy Ramage, Montrose, Colo.

Application March 14, 1940, Serial No. 323,966

4 Claims. (Cl. 136—171)

This invention relates to a combined battery and holder for use in connection with automotive vehicles.

The invention has for its object to enable one or the driver of an automotive vehicle to easily change batteries complete without danger of loss of connection.

The invention has for its further object to enable the changing of a battery with absolutely no danger of breaking the terminals of the latter.

A further object of the invention resides in the provision for enabling the positioning of the battery at any desired point on the frame of the vehicle.

A further object of the invention is to so dispose the battery whereby it is protected from dirt and moisture.

A further object of the invention is to always ensure for the proper positioning of a battery when substituting one battery for another to prevent a mistake in placing of the battery.

The invention has for a further object to provide for expeditiously changing a battery when desired without the aid of any wrenches, screw drivers or hammers.

The invention has for a further object to provide means, in a manner as hereinafter set forth, for eliminating all danger of breaking the terminals of a battery when substituting one battery for another.

The invention has for a further object to provide a holder for a battery and with the latter and the holder having correlated means to constitute the ground and positive connections for the battery circuit.

The invention has for a further object to provide a holder for the battery to protect the latter from dirt and moisture, and with the battery having extensions for its poles correlating with means on the holder to constitute the ground and positive connections for the battery circuit.

The invention has for its further object to provide, in a manner as hereinafter set forth, a battery and holder structure which is simple in its construction and arrangement, capable of being installed at any desired point on the frame of the vehicle, the battery being expeditiously removable from the holder when desired, compact, strong, durable, thoroughly efficient for the use intended thereby and comparatively inexpensive to set up.

Embodying the objects aforesaid and others which may hereinafter appear, the invention consists of the novel construction, combination and arrangement of parts as will be more specifically referred to and illustrated in the accompanying drawing wherein is shown an embodiment of the invention, but it is to be understood that changes, variations and modifications may be resorted to which fall within the scope of the invention as claimed.

In the drawing:

Figure 1 is a top plan view, broken away and partly in horizontal section of the holder and battery in accordance with this invention, Figure 2 is a section on line 2—2 Figure 1, and Figure 3 is a fragmentary view in elevation looking towards that end thereof to which the positive lead of the battery circuit is attached.

The holder, generally indicated at 5 is constructed of any suitable conducting material, preferably metallic and which is secured by any suitable means at any desirable point to the frame, not shown, of the vehicle. The holder 5 is of housing-like form and includes a bottom 6, a top wall 7, a pair of side walls 8, 9, a stationary end wall 10 and a shiftable end wall 11 in the form of a door which is hinged, as at 12 to the bottom 6. The said end wall 11 is flanged, as at 13 for the purpose of overlapping the top and side walls when end wall 11 is in position for closing the holder. The walls 10, 11 at their upper portions are formed with openings 14, 15 respectively. The opening 14 in wall 10 is arranged between the vertical median of such wall and the side wall 9. The opening 15 in the wall 11 is arranged between the vertical median of such wall and the side wall 8. The top wall 7 is formed with a set of spaced vent openings 16 which preferably will be intersected by the lengthwise median of wall 7.

The battery is generally indicated at 17. The positive and negative poles of the battery are indicated at 18, 19 respectively. There is correlated with and suitably secured to the poles 18, 19 the extensions 20, 21 respectively therefor of conducting material. The said extensions are oppositely disposed, of like form and disposed in lateral relation with respect to said poles. Preferably each extension will consist of a shank 22 merging at one end into the side of an annulus 23 which is mounted about and welded to a pole. The extensions 20, 21 are of a length for passage through and to project from the walls 10, 11 respectively. The extensions 20, 21 will be hereinafter referred to respectively as positive and negative male terminal sections.

Positioned against and secured to the inner face of wall 10 is a plate of insulation 24 formed with an opening 25 which is of less diameter than the opening 14. Positioned against and secured to the outer face of wall 10 is a plate of insulation 26 having an opening 27 of the same diameter as the opening 25. Mounted in the opening 14 is an annular member 28 of insulating material having its inner diameter corresponding to the diameter of the openings 25, 27. The inner edge of member 28 is flush with the walls of openings 25, 27. The male terminal section 20 extends outwardly through the opening 25, member 28 and opening 27 and is insulated from wall 10 by the plates 24, 26 and member 28.

Secured to the outer face of plate 26 is a metallic plate 29 of conducting material formed with an opening 30 which registers with the opening 27. Positioned against and secured to the outer face of plate 29 is the female terminal structure or section 31 which is for correlation with the male terminal section 20. The structure 31 includes a pair of oppositely disposed angle-shaped upper contact members 32, 33 of like form disposed in spaced aligned relation and coacting to form an outward continuation of the sides of the opening 30, and an outer yoke-shaped contact member 34 having its bight 35 extending across the outer ends of the members 32, 33. The bight 35 is of substantially V-form and extends towards the outer end of the continuation of the opening 30. Holdfast means, indicated at 36, 37 are common to the members 32, 33, 34 for securing them to the plates 24, 26, 29 and member 28. The said holdfast means 36, 37 also secure the member 28 in position and the plates 24, 26, 29 to the wall 10. The contact members 32, 33, 34 are resilient and preferably will be formed of stainless steel possessing acid and heat resisting characteristics. The male terminal 20 when extended through the plates 24, 26, 29 electrically engage with the contact members 32, 33, 34 and is capable of being removed from such engagement when the battery is to be changed. The contact members 32, 33 are in electrical engagement with the plate 29 and the contact member 34 with the members 32, 33. Electrically connected to the plate 29, as at 38 is the positive lead 39 of the battery circuit.

Secured to the wall 11 of the housing, in extended relation with the opening 15, is a negative female terminal structure or section 40 for correlation with the negative male terminal section 21. The structure 40 is in electrical contact with the wall 11 and it is not only constructed in the same manner as the structure 31, but is arranged similar to the wall 11 as the structure 31 is arranged relative to plate 29. The negative male terminal section 21 is for extension through opening 15 for electrical contact with the negative female structure or section 40. The said terminal section 21 engages with the structure 40 when wall 11 is swung to closing position relative to the holder.

The structure 31 includes a lower resilient contact member 41 of angle-shaped form which is secured to the plate 29 and disposed below the contacts 32, 33 and forms an outward continuation of the bottom of opening 30. The member 41 is to be engaged by the male terminal 20 when the latter is in contact with the members 32, 33, 34.

The wall 11 which constitutes a door is to be detachably secured in closed position by any suitable means, and by way of example for such there is shown a hasp 42 pushed to wall 11 and correlating with an inverted yoke 43.

The holder 5 provides a means for protecting the battery from dirt and moisture.

The holder 5 is shown whereby the battery is slid therein from one end, but it is to be understood that the holder may be formed in a manner to insert or drop the battery into the holder from the top thereof.

It is to be understood that the holder is to be of a form to fit any type of battery that might be required to be placed in vehicles at different places.

What we claim is:

1. In combination a normally closed holder of conducting material including bottom, top, front, rear and a pair of end walls, one of the end walls being stationary, the other end wall being hinged to the bottom wall and formed with flanges for overlapping the top, front and rear walls, each of said end walls being formed with an opening, an insulating member in the form of an annulus arranged within and seated against the edge of said opening in the stationary wall, front and rear plates of insulation arranged respectively against the outer and inner faces of said sationary end wall, said plates being formed with openings of less diameter than the opening in the stationary wall having their edges forming continuations of the inner edge of said annulus, a removable storage battery arranged in the holder and having positive and negative poles, a conducting plate positioned against the outer face of and having an opening aligned with the opening in the said outer plate of insulation, a positive male terminal section secured to said positive pole and removably extending through the annulus and the openings in said plates to beyond said conducting plate, a resilient positive female terminal section positioned at the front of said conducting plate and engageable with said positive male terminal section intermediate its ends and at its outer end, means common to and for securing said plates, member and positive female terminal section together and to said stationary end wall, a negative male terminal section secured to said negative pole and removably extending through said opening in said hinged wall, a resilient negative female terminal section electrically connected to said hinged wall and engaging with said negative male terminal section intermediate its ends and at its outer end, and means extended from said conducting plate for electrically connecting therewith the positive lead of the battery circuit.

2. In combination a normally closed holder of conducting material including bottom, top, front, rear and a pair of end walls, one of the end walls being stationary, the other end wall being hinged to the bottom wall and formed with flanges for overlapping the top, front and rear walls, each of said end walls being formed with an opening, an insulating member in the form of an annulus arranged within and seated against the edge of said opening in the stationary wall, front and rear plates of insulation arranged respectively against the outer and inner faces of said stationary end wall, said plates being formed with openings of less diameter than the opening in the stationary wall having their edges forming continuations of the inner edge of said annulus, a removable storage battery arranged in the holder and having positive and negative poles, a conducting plate positioned against the outer face of and having an opening aligned with the opening in the said outer plate of insulation, a positive male terminal section secured to said positive pole and removably extending through the annulus and the openings in said plates to beyond said conducting plate, a resilient positive female terminal section positioned at the front of said conducting plate and engageable with said positive male terminal section intermediate its ends and at its outer end, means common to and for securing said plates, member and positive female terminal section together and to said stationary end wall, a negative male terminal section secured to said negative pole and removably extending through said opening in said hinged wall, a resilient negative female terminal section electrically connected to said hinged wall and engaging with said negative male terminal section intermediate its ends and at its outer end, means extended from said conducting plate for electrically connecting therewith the positive lead of the battery circuit, and coacting means for latching the hinged end wall closed, said coacting means being on said hinged wall and one of the other walls of the holder.

3. In combination, a normally closed holder formed of conducting material having removably mounted therein a storage battery, said holder including a hinged wall to permit of the insertion therein of the battery and means for latching said wall closed, said holder having a wall opposing said hinged wall, said opposed walls formed with openings disposed in offset relation, outer and inner insulating means disposed against the outer and inner faces of one of the walls of said pair formed with openings opposing and of less diameter than the opening in such wall, an annulus of insulation in and seated against the edge of the opening in the said one wall and having its inner edge aligned with the walls of the openings in said insulating means, a positive male terminal section extending through said annulus and the openings in said insulating means to beyond said outer insulating means secured at its inner end to the positive pole of the battery, a resilient positive female terminal section positioned exteriorly of said outer insulating means and engaging said positive male terminal section intermediate its ends and at its outer end, an apertured conducting plate arranged against said outer insulating means and through which extends said positive male terminal section, means common to and for securing said plate, positive female section, said insulating means and annulus together and to the said one wall, means extended from said plate for electrically connecting therewith the positive lead of a battery circuit, a negative male terminal section removably extending through the opening in the other wall of said pair of walls and secured to the negative pole of the battery, and a resilient negative female terminal section electrically connected to the said other wall and engaging with said negative male terminal section intermediate its ends and at its outer end.

4. The invention as set forth by claim 3 having the positive female terminal section and the negative female terminal section of like form and each consisting of a pair of spaced parallel oppositely disposed resilient contacts of angle form, a lower resilient contact of angle form arranged on a line extending between the upper contacts and a resilient outer yoke-shaped contact extended outwardly from the upper and lower contacts, the arms of the outer contact being secured to the upper contacts and the bight of the outer contact bridging the space between the upper contacts.

ORON JONES.
ROY RAMAGE.